United States Patent
Nair et al.

(10) Patent No.: US 11,102,350 B2
(45) Date of Patent: Aug. 24, 2021

(54) INITIATING A SUBSEQUENT HOLD

(71) Applicant: Microsoft Technology Licensing, LLC, Redmond, WA (US)

(72) Inventors: Abhilash Chandrasekharan Nair, Bothell, WA (US); Namendra Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 16/584,193

(22) Filed: Sep. 26, 2019

(65) Prior Publication Data

US 2021/0099574 A1 Apr. 1, 2021

(51) Int. Cl.
*H04M 3/428* (2006.01)

(52) U.S. Cl.
CPC ....... *H04M 3/4283* (2013.01); *H04M 3/4285* (2013.01)

(58) Field of Classification Search
CPC ....................... H04M 3/428–4288; H04W 4/16
See application file for complete search history.

(56) References Cited

U.S. PATENT DOCUMENTS

| | | | |
|---|---|---|---|
| 5,875,231 A | 2/1999 | Farfan et al. | |
| 6,122,346 A | 9/2000 | Grossman | |
| 6,141,328 A | 10/2000 | Nabkel et al. | |
| 6,219,415 B1 | 4/2001 | Deutsch et al. | |
| 6,563,916 B1 | 5/2003 | Deutsch et al. | |
| 6,704,565 B1 | 3/2004 | Parsons et al. | |
| 6,731,609 B1 | 5/2004 | Hirni et al. | |
| 6,853,719 B2 | 2/2005 | McCormack et al. | |
| 7,006,618 B1* | 2/2006 | Shaffer | H04M 1/2535 379/202.01 |
| 7,209,475 B1 | 4/2007 | Shaffer et al. | |
| 7,477,893 B2 | 1/2009 | Belkin et al. | |
| 8,249,245 B2 | 8/2012 | Jay et al. | |
| 8,793,338 B2 | 7/2014 | Johnston | |
| 9,571,639 B2 | 2/2017 | Gabbai | |

(Continued)

OTHER PUBLICATIONS

"International Search Report and Written Opinion Issued in PCT Application No. PCT/US20/038273", dated Sep. 15, 2020, 12 Pages.

(Continued)

*Primary Examiner* — Pao Sinkantarakorn
(74) *Attorney, Agent, or Firm* — Schwegman Lundberg & Woessner, P.A.

(57) ABSTRACT

Disclosed are systems, methods, and non-transitory computer-readable media for delivering content to a client device placed on hold. A communication system establishes a communication session between a client device placed on an initial hold and a content delivery service, during which the client device placed on the initial hold may place a subsequent hold, resulting in multiple concurrent holds. The communication system allocates a unique identifier to the subsequent hold and updates records associated with the initial and subsequent holds to include an indication that the client device that ends the hold should be placed on hold. The communication system terminates the communication session between the client device placed on the initial hold and the content delivery service and returns the unique identifier allocated to the subsequent hold to the client device that initiated the subsequent hold.

20 Claims, 11 Drawing Sheets

(56) References Cited

U.S. PATENT DOCUMENTS

| | | | |
|---|---|---|---|
| 2003/0043990 A1 | 3/2003 | Gutta et al. | |
| 2005/0124326 A1 | 6/2005 | Belkin et al. | |
| 2007/0003045 A1 | 1/2007 | Florkey et al. | |
| 2009/0168978 A1 | 7/2009 | Laws et al. | |
| 2011/0075829 A1 | 3/2011 | Goldman et al. | |
| 2016/0021247 A1* | 1/2016 | Marimuthu | H04M 3/4286 455/414.1 |
| 2020/0259952 A1* | 8/2020 | Deole | H04M 3/4286 |

OTHER PUBLICATIONS

"MAS Music on Hold Fundamentals", Retrieved from: https://downloads.avaya.com/css/P8/documents/100096674, Jul. 27, 2007, 62 Pages.

"Music on Hold", Retrieved from: https://www.cisco.com/c/en/us/td/docs/voice_ip_comm/cucm/srnd/8x/moh.html, Retrieved Date: Jul. 22, 2019, 27 Pages.

"Ultra-Elegant Gigabit IP Phone SIP VP-T49G User Guide", Retrieved from: https://ziladoc.com/downloadFile/untitled-yealink_pdf, Jan. 2016, 303 Pages.

Arbuthnot, Tom, "Microsoft Teams Roadmap Watch: Music on Hold, Share System Audio, 100 person private chat and 3 more", Retrieved from: https://tomtalks.blog/2019/05/microsoft-teams-roadmap-watch-music-on-hold-share-system-audio-100-person-private-chat-and-3-more/, May 13, 2019, 7 Pages.

Mahy, et al., "A Call Control and Multi-Party Usage Framework for the Session Initiation Protocol (SIP)", Retrieved form: http://www.hjp.at/doc/rfc/rfc5850.html#page_36, May 2010, 45 Pages.

* cited by examiner

INITIATING A SUBSEQUENT HOLD

TECHNICAL FIELD

An embodiment of the present subject matter relates generally to communication sessions and, more specifically, to a delivering content to a client device placed on hold during a communication session.

BACKGROUND

In call routing, a call can be placed on hold by a user who may want to temporarily step away from the call. This may be done for any number of reasons including placing another call for consultation, picking up another incoming call or even to briefly physically step away. When a call is placed on hold, the social norm is to inform the other person verbally that the call is being placed on hold before the call is placed on hold. After a call is placed on hold, the user may hear dead air or music. The latter is generally preferred as dead air is awkward and can also be confused with a call stuck somewhere on the network.

Current solutions to play music during a hold are client-side solutions that rely on the client that places the hold to play music to the caller on hold. Client-side solutions have many limitations. Streaming media to callers increases complexity of client-side devices and/or infrastructure and adds extra cost. Further, due to platform limitations, these client-side solutions may be impossible to implement on various devices. For example, mobile devices typically are not able to stream media to a caller on hold while another call is in progress. Another problem is that the rights to use the music have to be acquired, which may limit the variety of music options as it increases the time needed to rollout new music and further increase costs.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
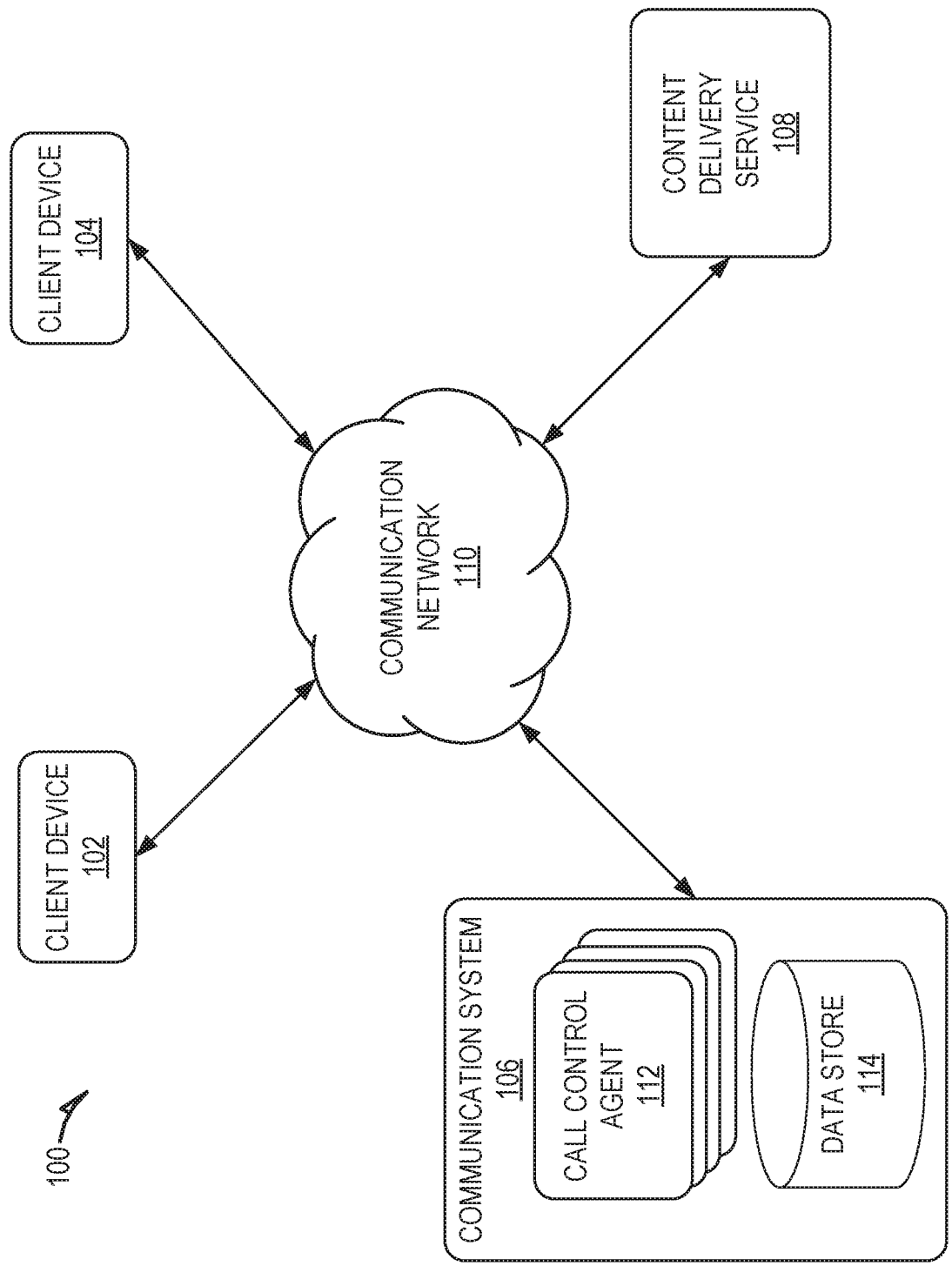
FIG. 1 shows an example system for delivering content to a client device placed on hold during a communication session, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for delivering content to a client device placed on hold during a communication session. A communication system facilitates communication sessions between various client devices. A communication session is an exchange of data between two or more client devices that allows users of the client devices to communicate with each other. For example, a communication session may be a voice communication session, such as a phone call or Voice over Internet protocol (VOIP) session, in which voice data is transmitted between the client devices. A communication session may also be a video communication session, such as a video conference, in which voice and image data are transmitted to and from one or more participating client devices.

In some instances, a user participating in a communication session may desire to place one or more other participants of the communication session on a temporary hold. For example, the user may need to attend to another matter, take another call, etc. During the hold, it is preferable to provide content to the client devices placed on hold to indicate to the other participants that they are on hold as well as to provide some entertainment while they wait for the communication session to be resumed. For example, music may be played for users placed on hold during a voice communication session. As another example, video and audio may be played for users placed on hold during a video communication session. As explained above, client-side solutions for providing media during a hold are problematic because the client device that initiates the hold must provide the content to the client devices placed on hold, which limits the selection of media that may be provide during the hold. Further, some client devices, such as mobile phones, may not be able to facilitate concurrent communication sessions. As the client device is only enabled to engage in one communication session at a time, a client-side solution to provide content during a hold cannot be used when the user wishes to place the hold to take another incoming call.

The communication system of the present disclosure alleviates these issues through use of a cloud-based solution for providing media to client devices placed on hold. Rather than streaming content from the client device that initiates the hold, as in a client-side solution, the communication system uses a cloud-based content delivery service to stream content to the client devices placed on hold. The communication system establishes a communication session between a client device placed on hold and the content delivery service, during which the content delivery service streams content to the client device via the established communication session. The communication session between the client device that initiated the hold and the client devices that are placed on hold is terminated, thereby allowing the client device that initiated the hold to establish communication sessions with other client devices.

The communication system allocates a unique identifier to the hold. For example, the communication system generates the unique identifier or reserves an available unique identifier from a pool of available unique identifiers. In either case, the communication system stores data identifying the communication sessions established between the client devices that are placed on hold and the content delivery service in a record associated with the unique identifier.

The communication system returns the unique identifier to the client device that initiated the hold, which the client device may then use to reference the hold to execute a desired action, such as ending the hold, terminating the communication session, retrieving a status of the hold, etc. For example, the client device transmits a command including the unique identifier to the communication system to execute a specified action, such as ending the hold, terminating the communication session, etc. The communication system uses the received unique identifier to identify the corresponding record, from which the data identifying the communication session between the client devices placed on hold and the content delivery service is retrieved. The communication system may then perform a requested action such as ending the hold. For example, the communication system may establish a new communication session between the client device that placed the hold and the client device that was placed on the hold. The communication system may also terminate the communication session between the client device placed on the hold and the content delivery service.

In some instances, a client device that is placed on hold (e.g., a client device engaged in a communication session with the content delivery service) may wish to place a subsequent hold. This creates a situation in which multiple holds are placed concurrently (e.g., the initial hold and the subsequent hold). As a result, the client device that ends their respective hold first should be placed on hold until the other concurrent hold is ended. For example, if the client device that placed the initial hold requests to end the hold while the subsequent hold is active, the client device that placed the initial hold should be placed on hold until the subsequent hold is ended. Alternatively, if the client device that placed the subsequent hold requests to end the hold while the initial hold is active, the client device that placed the subsequent hold should be placed on hold until the initial hold is ended.

To initiate a subsequent hold, the communication system allocates a unique identifier to the subsequent hold. A subsequent hold places a hold on the content delivery service rather than a client device. Establishing a communication session to provide content during the subsequent hold therefore provides no user benefit and wastes computing resources as it results in the content delivery service providing content to itself. The communication system therefore does not establish a communication session with the content delivery service to provide content during the subsequent hold. Instead, the communication system represents the subsequent hold virtually by updating the record corresponding to the unique identifier for the subsequent hold to indicate that the subsequent hold was placed on the content delivery service. As a result, ending the subsequent hold results in a new communication session being established between the client device and the content delivery service.

The communication system also updates the record associated with the initial hold to indicate that ending the initial hold should result in the client device that ended the initial hold being placed on hold. That is, ending the initial hold should result in a new communication session being established between the client device that initiated the initial hold and the content delivery service. Likewise, the communication system also updates the record associated with the subsequent hold to indicate that ending the subsequent hold should result in the client device that ended the subsequent hold being placed on hold. That is, ending the subsequent hold should result in a new communication session being established between the client device that initiated the subsequent hold and the content delivery service.

FIG. 1 shows an example system 100 for delivering content to a client device placed on hold during a communication session, according to some example embodiments. As shown, multiple devices (i.e., client device 102, client device 104, communication system 106, and content delivery service 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1100 shown in FIG. 11.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users communicate with and utilize the functionality of the communication system 106 by using the client devices 102 and 104 that are connected to the communication network 110 by direct and/or indirect communication. Although the shown system 100 includes only two client devices 102, 104, this is only for ease of explanation and is not meant to be limiting. One skilled in the art would appreciate that the system 100 can include any number of client devices 102, 104. Further, the communication system 106 may concurrently accept connections from and interact with any number of client devices 102, 104. The communication system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the communication system 106 via a client-side application installed on the client devices 102 and 104. In some embodiments, the client-side application includes a component specific to the communication system 106. For example, the component may be a stand-alone application, one or more application plug-ins, and/or a browser extension. However, the users may also interact with the communication system 106 via a third-party application, such as a web browser, that resides on the client devices 102 and 104 and is configured to communicate with the communication system 106. In either case, the client-side application presents a user interface (UI) for the user to interact with the communication system 106. For example, the user interacts with the communication system 106 via a client-side application integrated with the file system or via a webpage displayed using a web browser application.

The communication system 106 is one or more computing devices configured to facilitate and manage communication session between multiple client devices 102, 104. A communication session is an exchange of data between two or more client devices 102, 104 that enables users of the client devices 102, 104 to communicate with each other. For example, a communication session may be a voice communication session, such as a phone call or Voice over Internet protocol (VOIP) session, in which voice data is transmitted between the client devices 102, 104. A communication session may also be a video communication session, such as a video conference, in which voice and image data are transmitted among the client devices 102, 104.

The communication system 106 utilizes multiple call control agents 112 to establish communication sessions between client devices 102, 104 and manage call signaling for the established communication sessions. While a call control agent 112 establishes a communication session between client devices 102, 104 and manages call signaling, media transmitted as part of the established communication sessions may flow directly between the client devices 102, 104. Each call control agent 112 may be implemented in software and/or hardware. A command transmitted by a client device 102 to initiate a communication session is provided to a call control agent 112 by the communication system 102. The call control agent 112 may then processes the command by establishing the communication session between the client devices 102, 104.

The call control agent 112 may receive and process subsequent commands received from the client devices 102, 104 engaged in a communication session established by the call control agent 112. For example, the commands may request to perform a specified action in relation to the communication session, such as terminating the communication session, executing a transfer or replacement in relation to a communication session, or providing a requested feature in relation to the communication session, such as placing a hold on the communication session. A hold placed on the communication session results in a temporary pause, during which the users participating in the communication session are not able to communicate with each other. A user may wish to place a hold for any of a number of reasons, such as to attend to another matter, establish another communication session, etc.

During a hold, it is preferable to provide content (e.g., music, video) to the client device 102 placed on hold to indicate that the hold is in place as well as to provide some entertainment while the user waits for the communication session to be resumed. As explained above, client-side solutions for providing media during a hold are problematic. Accordingly, the communication system 106 uses a cloud-based solution for providing media to client devices 102, 104 placed on hold. Specifically, the communication system 106 uses the content delivery service 108 to stream content to a client device 102 placed on hold.

The content delivery service 108 is one or more computing devices configured to stream content or provide any other type of service to a client device 102, 014 via a communication session. For example, the content delivery service 108 may stream content such as music, video, audio, etc. The content delivery service 108 may also provide a service, such as an interactive voice response (IVR) service.

The call control agent 112 facilitates the hold functionality for a communication session. For example, the call control agent 112 may receive a command from a client device 102 engaged in a communication session with another client device 104 to place a hold on the other client device 104. In response, the call control agent 112 establishes a communication session between the client device 104 placed on hold and the content delivery service 108. The content delivery service 108 streams content to the client device 104 via the established communication session during the hold. The call control agent 112 may also terminate the communication session between the client device 102 that initiated the hold and the client device 104 that placed on hold. This allows the client device 102 that initiated the hold to establish communication sessions other client devices 102, 104.

The call control agent 112 allocates a unique identifier to the hold. For example, the call control agent 112 generates the unique identifier or reserves an available unique identifier from a pool of available unique identifiers. For example, the data store 114 may maintain a listing of unique identifier and the call control agent 112 may communicate with the data store 114 to request that an available unique identifier (e.g., a unique identifier that is not allocated to another hold) be allocated to the hold being placed by the call control agent 112.

The call control agent 112 stores data identifying the communication session established between the client device 104 that is placed on hold and the content delivery service 108 in a record associated with the unique identifier.

For example, the record is maintained by the data store 114 and the call control agent 112 communicates with the data store 114 to request that the record be updated to include the data identifying the communication session.

The call control agent 112 returns the unique identifier to the client device 102 that initiated the hold, which the client device 102 may then use to reference the hold to execute subsequent desired actions, such as ending the hold, terminating the communication session, retrieving a status of the hold, etc. For example, the client device 102 transmits a command including the unique identifier to the call control agent 112 to execute a specified action, such as ending the hold, terminating the communication session, etc. The call control agent 112 uses the received unique identifier in a request transmitted to the data store 114 for the record corresponding to the unique identifier. The call control agent 112 uses the returned data identifying the communication session between the client device 104 placed on hold and the content delivery service 108 to then perform the requested action such as ending the hold. For example, the call control agent 112 may establish a new communication session between the client device 102 that placed the hold and the client device 104 that was placed on the hold. The call control agent 112 may also terminate the communication session between the client device 104 placed on the hold and the content delivery service 108.

Once a hold has been ended, the call control agent 112 may update the data store 114 to update or delete the record associated with the unique identifier. For example, the call control agent 112 may transmit a command to the data store 114 to deallocate the unique identifier from the hold. As a result, the unique identifier is marked as available to be allocated to another hold. As another example, the call control agent 112 may transmit a command to the data store 114 to have the record and the unique identifier deleted from the data store 114.

In some instances, a client device 102 that is placed on hold (e.g., a client device 102 engaged in a communication session with the content delivery service106) may wish to place a subsequent hold. This creates a situation in which multiple holds are placed concurrently (e.g., the initial hold and the subsequent hold). As a result, the client device 102, 104 that ends their respective hold first should be placed on hold until the other concurrent hold is ended. For example, if the client device 102 that placed the initial hold requests to end the initial hold while the subsequent hold is active, the client device 102 that placed the initial hold should be placed on hold until the subsequent hold is ended. Alternatively, if the client device 104 that placed the subsequent hold requests to end the subsequent hold while the initial hold is active, the client device 104 that placed the subsequent hold should be placed on hold until the initial hold is ended.

To initiate a subsequent hold, the call control agent 112 allocates a unique identifier to the subsequent hold. The subsequent hold places a hold on the content delivery service 108 rather than a client device 102, 104. Establishing a communication session to provide content during the subsequent hold would therefore provide no user benefit and waste computing resources as it results in the content delivery service 108 providing content to itself. The call control agent 112 therefore does not establish a communication session with the content delivery service 108 to provide content during the subsequent hold. Instead, the call control agent 112 represents the subsequent hold virtually by updating the record corresponding to the unique identifier allocated to the subsequent hold to indicate that the subsequent hold was placed on the content delivery service 108.

For example, the record may be updated to include an indication that when the client device 102 ends the subsequent device the client device 102 should be place on hold. As result, ending the subsequent hold results in a new communication session being established between the client device 102 and the content delivery service 108.

The call control agent 112 also updates the record associated with the initial hold to indicate that ending the initial hold in the call should result in the client device 104 being placed on hold. That is, the record is updated to include an indication that ending the initial hold should result in a new communication session being established between the client device 104 that initiated the initial hold and the content delivery service 108.

Figure 2:
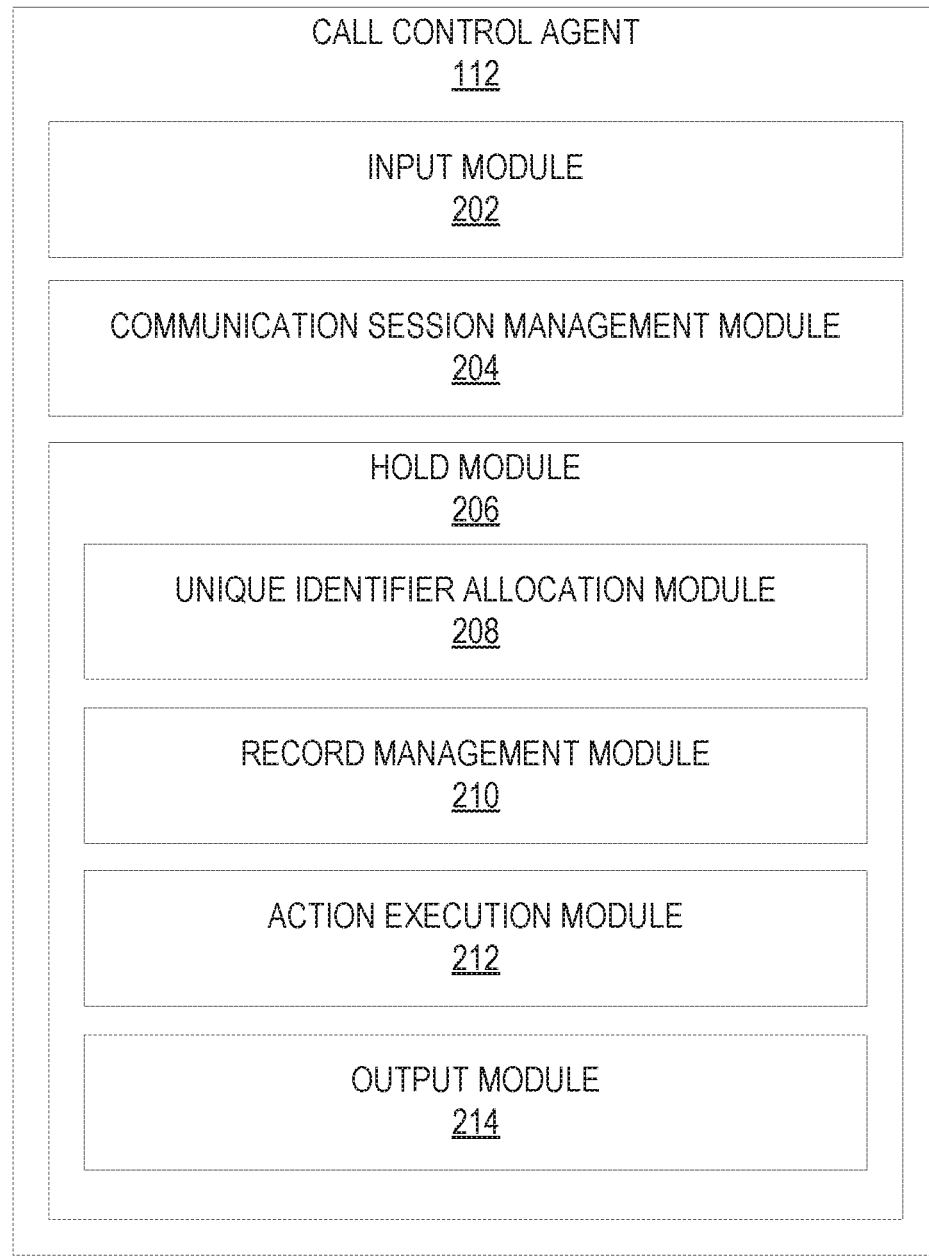
FIG. 2. is a block diagram of a call control agent, according to some example embodiments.

FIG. 2 is a block diagram of a call control agent 112, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the call control agent 112 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the call control agent 112 includes an input module 202, a communication session management module 204 and a hold module 206. The hold module 206 includes a unique identifier allocation module 208, a record management module 210, an action execution module 212, and an output module 214.

The input module 202 receives commands from client devices 102, 104. Each command may request that a specified action be executed, such as establishing a communication session, terminating a communication session, placing a hold, ending a hold, executing a transfer or replacement, etc. Commands received by the input module 202 may also include unique identifiers referencing holds placed on a communication session. The input module 202 provides received commands and/or data extracted from the received commands (e.g., a unique identifier) to the other modules of the call control agent 112.

The communication session management module 204 establishes and manages communication session between client devices 102, 104. For example, the communication session management module 204 processes call invitation commands to establish a new communication session between client devices 102, 104. Establishing a communication session includes transmitting call notifications to the client devices 102, 104 participating in the new communication session, receiving and relaying call acceptances/acknowledgements, etc.

The communication session management module 204 may also processes transfer and replacement commands in relation to existing communication sessions. A transfer command is a command to transfer a client device 102 engaged a communication session facilitated by the call control agent 112 to a new communication session. For example, the communication session management module 204 communicates with the client devices 102, 104 engaged in the communication session to orchestrate establishment of the new communication session as well as termination of the previous communication session A replacement command is a command to replace an existing communication session facilitated by a different call control agent 112 with a new communication session. For example, the communication session management module 204 communicates with the other call control agent 112 to initiate the replacement, establish the new communication session and terminate the previous communication session.

The hold module 206 manages holds during communication session, including initiating a hold and ending the hold. The hold module 206 also facilitates communication between the client device 102 that is placed on hold and the content delivery service 108 to provide content to the client device 102 during the hold. For example, the hold module 206 instructs the communication session management module 204 to establish a communication session between the client device 102 that is placed on hold and the content delivery service 108. The content delivery service 108 provides content to the client device 102 via the established communication session.

The hold module 206 includes a unique identifier allocation module 208, a record management module 210, an action execution module 212, and an output module 214. The unique identifier allocation module 208 allocates a unique identifier for each hold. A unique identifier is any type of unique value, set of characters, etc., used to uniquely identify a hold placed during a communication session.

In some embodiments, the unique identifier allocation module 208 generates a new unique identifier for the hold. For example, the unique identifier allocation module 208 may use a value generation algorithm that generates unique identifiers. The unique identifier allocation module 208 may create a new record associated with the generated unique identifier in the data store 114. The record may be used to store data associated with the hold.

Alternatively, in some embodiments, the unique identifier allocation module 208 communicates with the data store 114 to allocate a unique identifier to the hold. For example, the data store 114 may maintain a pool of unique identifiers, including available unique identifier that are not currently allocated to a hold, and allocated unique identifiers that are currently allocated to a hold. The unique identifier allocation module 208 communicates with the data store 114 to identify an available unique identifier to allocate to the hold. The unique identifier allocation module 208 updates the data store 114 to indicate that the identified unique identifier has been allocated to the hold and is therefore not available to be allocated to another hold.

The record management module 210 manages functionality in relation to records stored in the data store 114. For example, the record management module 201 communicates with the data store 114 to identify a record associated with a unique identifier, access data from the record, update the record, delete the record, deallocate unique identifier, etc.

The action execution module 212 executes a requested action in relation to a hold. For example, the action execution module 212 may execute an action such as ending a hold, determining the status of a hold, terminating a communication session with an active hold, etc. Ending a hold results in the hold placed on a client device 102 being removed and a new communication session being established between the client device 102 that was placed on hold and the client device 104 that initiated the hold. In contrast, terminating a communication session with an active hold results in the hold being ended (e.g., the communication session between the client device 102 placed on hold and the content delivery service 108 being ended), without a new communication session between the client device 102 that was placed on the hold and the client device 104 that placed the hold being established. Determining the status of a hold provides a status indicating whether the client device 102 placed on hold remains on hold or has terminated the communication session.

The output module 214 provides output data to client devices 102, 104. For example, the output module 214 may return the unique identifier allocated to a hold to the client device 102 that requested the hold. As another example, the output module 214 may return data indicating the status of a hold to a client device 102 that requested the status.

Figure 3:
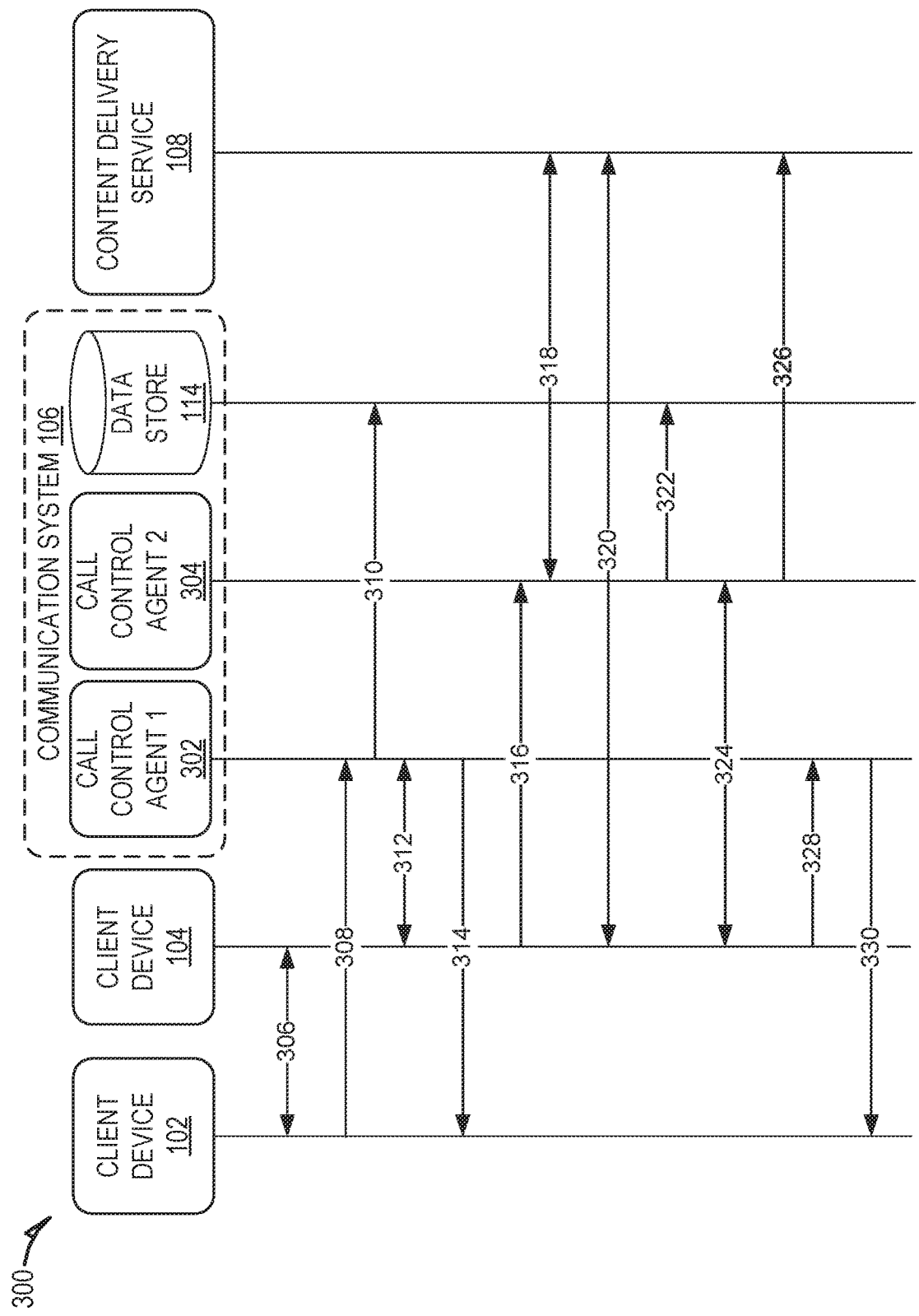
FIG. 3 shows a message flow for delivering content to a client device placed on hold, according to some example embodiments.

FIG. 3 shows a message flow 300 for delivering content to a client device 104 placed on hold, according to some example embodiments. To avoid obscuring the inventive subject matter with unnecessary detail, various functional components (e.g., modules) and messages that are not germane to conveying an understanding of the inventive subject matter have been omitted from FIG. 3. However, a skilled artisan will readily recognize that various additional functional components and messages may be supported to facilitate delivering content to a client device placed on hold during a communication session or additional functionality that is not specifically described herein. Furthermore, the various functional components (e.g., agents, databases, devices, etc.) depicted in FIG. 3 may reside on a single computing device or may be distributed across several computing devices in various arrangements such as those used in cloud-based architectures. For example, the various functional modules and components may be distributed amongst multiple computing devices that facilitate both the communication system 106 and the content delivery service 108.

As shown, two client devices 102, 104 are engaged in a communication session 306. The communication session 306 is an exchange of data between the client devices 102,104 that allows users of the client devices 102, 104 to communicate with each other. For example, the communication session 306 may be a voice communication session (e.g., phone call, VOIP session) or a video communication session (e.g., video conference).

During the communication session 306, one of the users participating in the communication session 306 may wish to place a hold on another user participating in the communication session. The user may utilize their client device 102 to initiate the hold by selecting a user interface element (e.g., button) presented on a display of the client device 102. Initiating the hold causes the client device 102 to transmit a hold command 308 to the call control agent 1 302 of the communication system 106 that manages call signaling for the communication session 306. The hold command 308 transmitted by the client device 102 requests that a hold be placed on the other client device 104 that is engaged in the communication session 306.

In response to receiving the hold command 308, the call control agent 1 302 allocates a unique identifier to the hold. For example, the call control agent 1 communicates 310 with the data store 114 to identify an available unique identifier maintained by the data store and allocate the identified unique identifier to the hold. The unique identifier may be allocated to the hold by updating a record associated with the unique identifier to indicate that the unique identifier has been allocated to a hold and is therefore not available to be allocated to a different hold.

During the hold, it is preferable to provide the client device 104 with content, such as music, to indicate that the hold is active. To accomplish this, the client device 104 is connected to the content delivery service 108, which delivers content to the client device 104. The call control agent 1 302 connects the client device 104 with the content delivery service by initiating a transfer (e.g., attended transfer). For example, the call control agent 1 302 communicates 312 with the client device 104 to be placed on hold to initiate the transfer. For example, the call control agent 1 302 communicates 312 with the client device 104 by transmitting a call transfer command to the client device 104 and receiving a call transfer acknowledgement indicating that the client device 104 has received/accepted the call transfer command. The call transfer command includes data to be used by the client device 104 to initiate the transfer, such as data identifying the content delivery service 108. The call transfer command may also include the unique identifier allocated to the hold. The call control agent 1 302 also transmits a communication 314 to the client device 102 that initiated the hold to indicate that the client device 104 being placed on hold has acknowledged the transfer.

The client device 104 being placed on hold initiates the transfer by transmitting a command 316 (e.g., invitation command) to a call control agent 2 304 of the communication system 106 to initiate a communication session 320 between the client device 104 and the content delivery service 108. The command 316 includes the unique identifier allocated to the hold.

The call control agent 2 304 establishes the requested communication session 320 between the client device 104 and the content delivery service 108 in response to receiving the command 316. For example, the call control agent 2 304 communicates 318 with the content delivery service 108 by sending a call notification to the content delivery service 108 to initiate the communication session 320 with the client device 103 and receiving a call acceptance from the content delivery service 108 that the call notification has been accepted and that the communication session 320 has been established.

The call control agent 2 304 communicates 322 with the data store 114 to update the record associated with the unique identifier. For example, the call control agent 2 304 updates the record to include metadata identifying the established communication session 320, such as data identifying the call control agent 2 304 that manages signaling for the communication session 320. The call control agent 2 may also communicate 324 with the client device 104 that is placed on hold to confirm that the transfer has been accepted. For example, the call control agent 2 304 communicates 324 by sending a call acceptance to the client device 104 and receiving a call acceptance acknowledgement from the client device 104. The call control agent 2 304 may in turn transmit a message 326 to the content delivery service 108 confirming the call acceptance acknowledgement.

The client device 104 placed on hold transmits a notification 328 to the call control agent 1 302 indicating that the call transfer is complete. This notification signals the call control agent 1 302 to terminate the communication session 306 between the client devices 102, 104. Accordingly, the call control agent 1 302 transmits a notification 330 to the client device 102 that initiated the hold, which notifies the client device that the call transfer is complete. The notification 330 may include the unique identifier allocated to the hold, which the client device 102 may use to reference the hold in subsequent commands to perform requested actions (e.g., end the hold). The client device 102 that initiated the hold may respond to the call control agent 1 302 with a confirmation that the communication session 306 between the client devices 102, 104 has ended.

Figure 4:
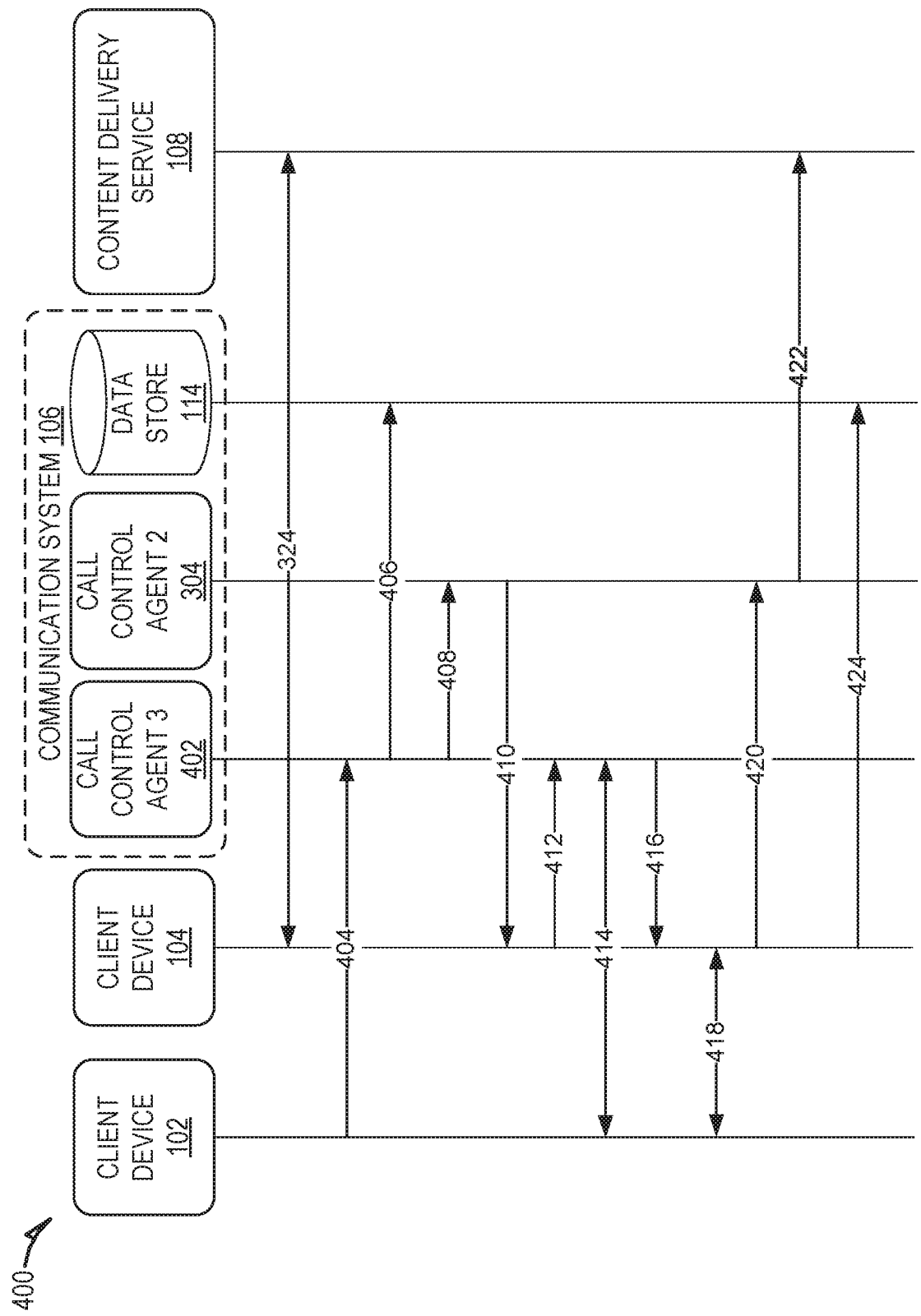
FIG. 4 shows a message flow for ending a hold, according to some example embodiments.

FIG. 4 shows a message flow 400 for ending a hold, according to some example embodiments. To avoid obscuring the inventive subject matter with unnecessary detail, various functional components (e.g., modules) and messages that are not germane to conveying an understanding of the inventive subject matter have been omitted from FIG. 4. However, a skilled artisan will readily recognize that various additional functional components and messages may be supported to facilitate delivering content to a client device placed on hold during a communication session or additional functionality that is not specifically described herein. Furthermore, the various functional components (e.g., agents, databases, devices, etc.) depicted in FIG. 4 may reside on a single computing device or may be distributed across several computing devices in various arrangements such as those used in cloud-based architectures. For example, the various functional modules and components may be distributed amongst multiple computing devices that facilitate both the communication system 106 and the content delivery service 108.

As shown, a client device 104 and the content delivery service 108 are engaged in a communication session 324 in which the content delivery service 108 provides the client device 104 with content (e.g., music) during a hold. The client device 102 that initiated the hold may end the hold by transmitting a command 404 to a call control agent 3 402 of the communication system 106 to end the hold. The command 404 includes the unique identifier allocated to the hold. The call control agent 3 402 uses the unique identifier to communicate 406 with the data store 114 and access the record corresponding to the unique identifier. The record includes metadata identifying the communication session 324 established for the hold. For example, the metadata includes data identifying the call control agent 2 304 that manages signaling for the communication session 324 between the client device 104 placed on hold and the content delivery service 108.

The call control agent 3 402 may then transmit a command 408 to the call control agent 2 304 that manages signaling for the communication session 324 to initiate a replacement of the communication session 324 between the client device 104 placed on hold and the content delivery service 108 with a new communication session 418 between the client devices 102, 104. In response to receiving the command 408, the call control agent 2 304 transmits a command 410 to the client device 104 placed on hold to initiate the replacement. In turn, the client device 104 transmits a message 412 to the call control agent 3 402 accepting the replacement.

The call control agent 3 402 communicates with the client device 102 that initiated the hold to indicate that the replacement has been accepted and receives an acknowledgement, which may then be forwarded in a message 416 to the client device 104 placed on hold. To complete the replacement, the client device 104 that was placed on hold notifies 420 the call control agent 2 304 that the communication session 324 has been ended. The call control agent 2 304 may in turn notify 422 the content delivery service 108 that the communication session 324 has been ended.

The call control agent 3 402 may communicate with the data store 114 to update the record associated with the unique identifier allocated to the hold to indicate that the hold has been ended. For example, the metadata associated with the record may be deleted and the unique identifier may be reassigned as available to be allocated to another hold. Alternatively, in some embodiments, the record and/or the unique identifier may be deleted.

Figure 5:
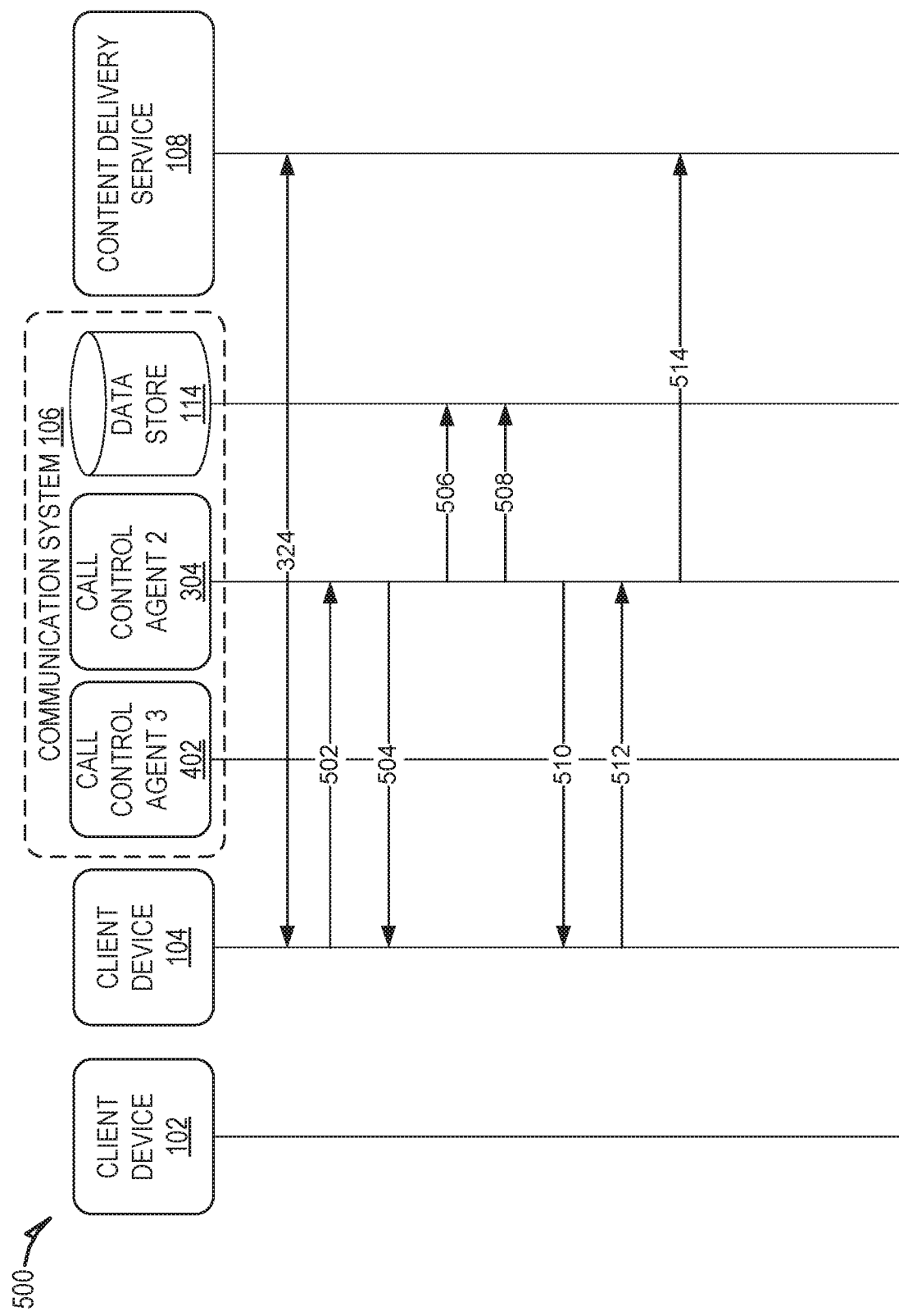
FIG. 5 shows a message flow for placing a subsequent hold, according to some example embodiments.

FIG. 5 shows a message flow 500 for placing a subsequent hold, according to some example embodiments. To avoid obscuring the inventive subject matter with unnecessary detail, various functional components (e.g., modules) and messages that are not germane to conveying an understanding of the inventive subject matter have been omitted from FIG. 5. However, a skilled artisan will readily recognize that various additional functional components and messages may be supported to facilitate delivering content to a client device placed on hold during a communication session or additional functionality that is not specifically described herein. Furthermore, the various functional components (e.g., agents, databases, devices, etc.) depicted in FIG. 5 may reside on a single computing device or may be distributed across several computing devices in various arrangements such as those used in cloud-based architectures. For example, the various functional modules and components may be distributed amongst multiple computing devices that facilitate both the communication system 106 and the content delivery service 108.

As shown, a client device 104 is engaged in a communication session 324 with the content delivery service 108 as a result of the client device 104 being placed on hold by another client device 102. The content delivery service 108 provides the client device 104 with content (e.g., music) during the hold. In some instances, the client device 104 that is placed on hold may wish to place a subsequent hold. This creates a situation in which multiple holds are placed concurrently (e.g., the initial hold placed by one client device 102 and the subsequent hold placed by the other client device 104). As a result, the client device 102, 104 that ends their respective hold first should be placed on hold until the other concurrent hold is ended. For example, if the client device 102 that placed the initial hold requests to end the initial hold while the subsequent hold is active, the client device 102 that placed the initial hold should be placed on hold until the subsequent hold is ended. Alternatively, if the client device 104 that placed the subsequent hold requests to end the subsequent hold while the initial hold is active, the client device 104 that placed the subsequent hold should be placed on hold until the initial hold is ended.

To initiate a subsequent hold, the client device 104 that is placed on hold transmits a command to the call control agent 304 that manages signaling for the communication session 324 to place the subsequent hold. A subsequent hold places a hold on the content delivery service 108 rather than a client device 102, 104, Establishing a communication session to provide content during the subsequent hold would therefore provide no user benefit and wastes computing resources as it results in the content delivery service 108 providing content to itself. The call control agent 2 304 therefore does not establish a communication session with the content delivery service 108 to provide content during the subsequent hold.

Instead, the call control agent 2 304 represents the subsequent hold virtually by updating a record corresponding to a unique identifier allocated to the subsequent hold to indicate that the subsequent hold was placed on the content delivery service 108. To accomplish this, the call control agent 2 304 transmits a response 504 to the client device 104 indicating that the hold has been accepted. The call control agent 2 304 then communicates 506 with the data store 114 to update the record associated with the unique identifier allocated to the initial hold (e.g., the hold placed by client device 102 during the communication session 306 between the client devices 102, 104). The record associated with the unique identifier allocated to the initial hold is updated to include an indication that when the initial hold is ended, the client device 10e should be placed on hold (e.g. connected to the content delivery service) until the subsequent hold is also ended.

The call control agent 2 304 also communicates 508 with the data store 114 to allocate a unique identifier to the subsequent hold placed by the client device 104 that was placed on the initial hold. The call control agent 2 304 updates the record associated with the unique identifier allocated to the subsequent hold to identify the initial hold (e.g., the unique identifier allocated to the initial hold) and to include an indication that the ending the subsequent hold should result in the client device 104 being placed on hold.

The call control agent 2 304 then transmits a message 510 to the client device 104 indicating that the subsequent hold has been established. The message 510 includes the unique identifier allocated to the subsequent hold, which the client device 104 may use to reference the subsequent hold to perform a requested action. In response, the client device 104 provides the call control agent 2 304 with a command 512 to end the communication session 324 between the client device 104 and the content delivery service 108. The call control agent 2 304 in turn transmits a command 514 to the content delivery service 108 to end the communication session 324 between the client device 104 and the content delivery service 108.

Figure 6:
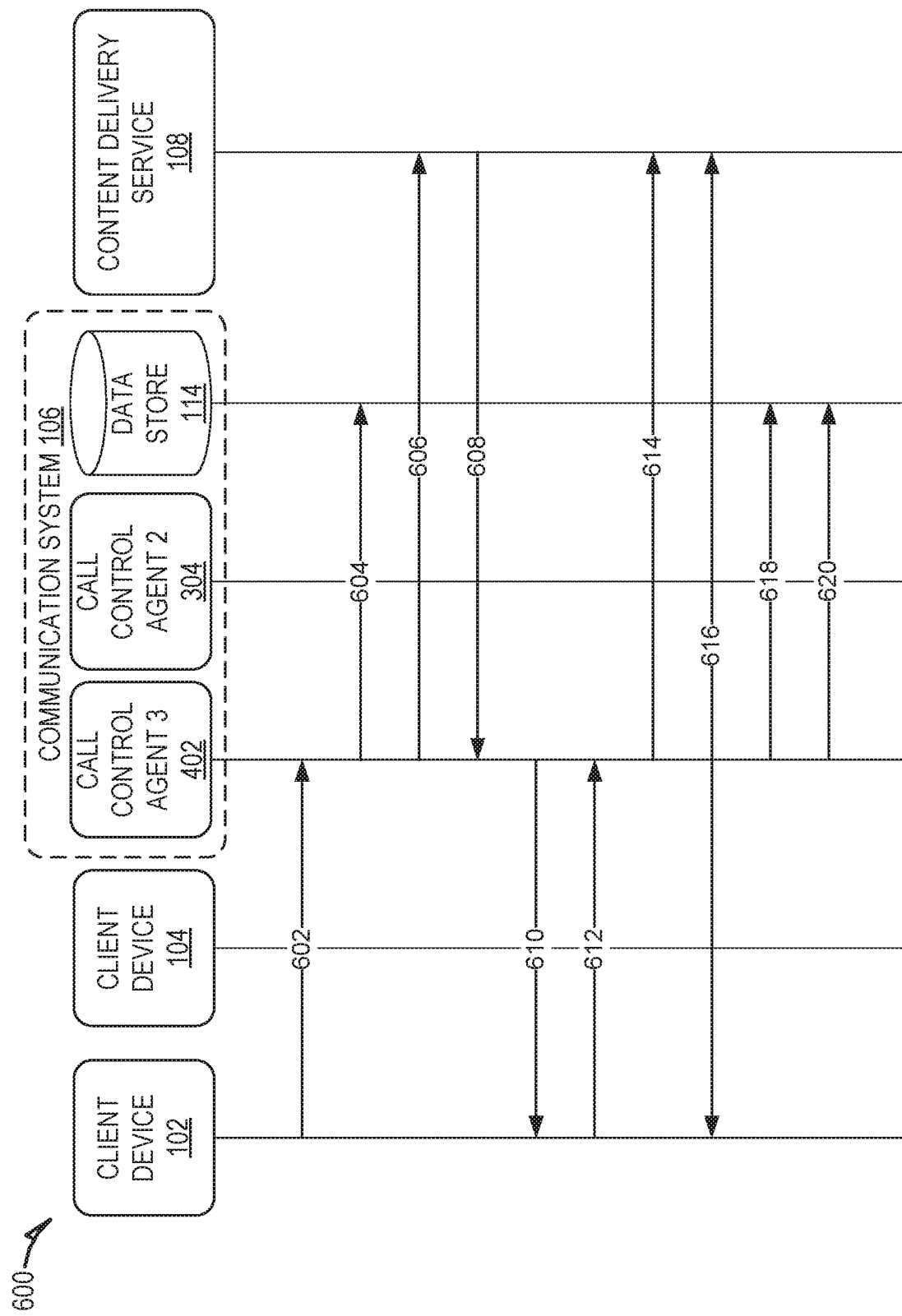
FIG. 6 shows a message flow for ending an initial hold while a subsequent hold is in place, according to some example embodiments.

FIG. 6 shows a message flow 600 for ending an initial hold while a subsequent hold is in place, according to some example embodiments. To avoid obscuring the inventive subject matter with unnecessary detail, various functional components (e.g., modules) and messages that are not germane to conveying an understanding of the inventive subject matter have been omitted from FIG. 6. However, a skilled artisan will readily recognize that various additional functional components and messages may be supported to facilitate delivering content to a client device placed on hold during a communication session or additional functionality that is not specifically described herein. Furthermore, the various functional components (e.g., agents, databases, devices, etc.) depicted in FIG. 6 may reside on a single computing device or may be distributed across several computing devices in various arrangements such as those used in cloud-based architectures. For example, the various functional modules and components may be distributed amongst multiple computing devices that facilitate both the communication system 106 and the content delivery service 108.

The client device 102 that initiated the initial hold transmits a command 602 to a call control agent 3 402 of the communication system 106 to end the initial hold. The command 602 includes the unique identifier allocated to the initial hold. The call control agent 3 402 queries 604 the data store 114 based on the unique identifier to access the record corresponding to the unique identifier. The record includes an indication that the client device 102 is to be placed on hold when the initial hold is ended. This is because the client device 104 that was placed on the initial hold has initiated a subsequent hold.

The call control agent 3 402 transmits a command 606 to the content delivery service 108 to initiate a communication session 616 between the client device 102 and the content delivery service 108. For example, the command 606 may be a call notification. In response, the content delivery service 108 provides a response 608 accepting the command to initiate the communication session 616. For example, the response 608 may be a call acceptance.

The call control agent 3 402 then notifies 610 the client device 102 that the content delivery service 108 accepted the command to initiate the communication session 616 and may receive an acknowledgement from the client device 102 in return. The call control agent 3 402 provides an acknowledgement 614 to the content delivery service 108.

In addition to establishing the communication session 616 between the client device 102 and the content delivery service 108, the call control agent 3 402 also updates the records in the data store 114 to indicate that the initial hold has been ended. For example, the call control agent 3 402 sends an update 618 to the data store 114 to update the record associated with the initial hold to remove the indication that the client device 102 should be placed on hold, delete the record and/or reallocate the unique identifier allocated to the initial hold. The call control agent 3 402 also sends an update 620 to the data store 114 to update the record associated with the subsequent hold to remove the indication that the client device 104 that initiated the subsequent hold should be placed on hold when the subsequent hold is ended. The update 620 may also include data identifying the communication session 616 between the client device 102 and the content delivery service 108. For example, the update 620 may include data identifying the call control agent 3 402 that manages signal processing for the communication session 616 between the client device 102 and the content delivery service 108.

Figure 7:
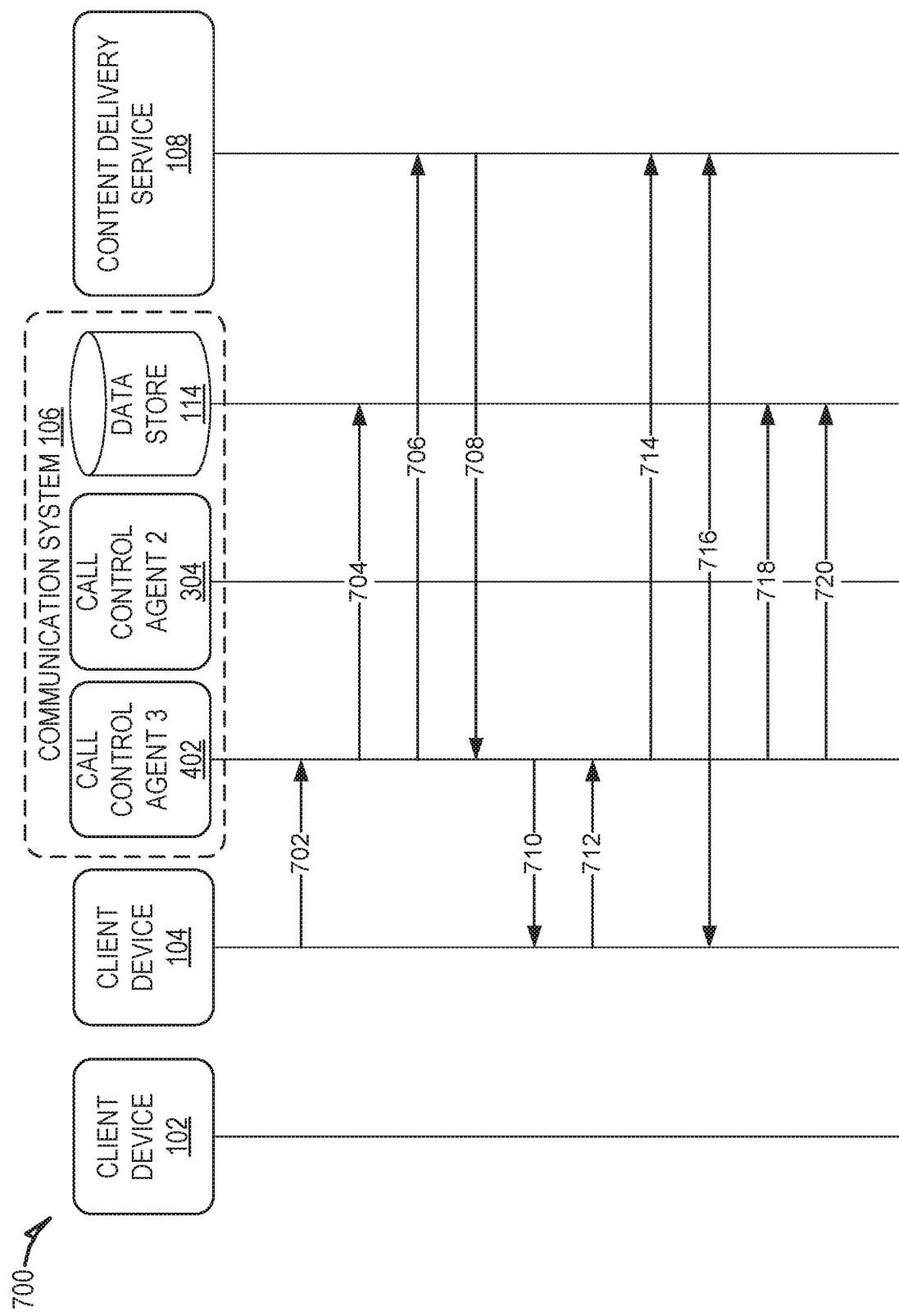
FIG. 7 shows a message flow for ending a subsequent hold while an initial hold is in place, according to some example embodiments.

FIG. 7 shows a message flow 700 for ending a subsequent hold while an initial hold is in place, according to some example embodiments. To avoid obscuring the inventive subject matter with unnecessary detail, various functional components (e.g., modules) and messages that are not germane to conveying an understanding of the inventive subject matter have been omitted from FIG. 7. However, a skilled artisan will readily recognize that various additional functional components and messages may be supported to facilitate delivering content to a client device placed on hold during a communication session or additional functionality that is not specifically described herein. Furthermore, the various functional components (e.g., agents, databases, devices, etc.) depicted in FIG. 7 may reside on a single computing device or may be distributed across several computing devices in various arrangements such as those used in cloud-based architectures. For example, the various functional modules and components may be distributed amongst multiple computing devices that facilitate both the communication system 106 and the content delivery service 108.

The client device 104 that initiated the subsequent hold transmits a command 702 to a call control agent 3 402 of the communication system 106 to end the subsequent hold. The command 702 includes the unique identifier allocated to the subsequent hold. The call control agent 3 402 queries 704 the data store 114 based on the unique identifier to access the record corresponding to the unique identifier. The record includes an indication that the client device 104 is to be placed on hold when the subsequent hold is ended. This is because the initial hold has not ended (e.g., the initial hold is active).

The call control agent 3 402 transmits a command 706 to the content delivery service 108 to initiate a communication session 716 between the client device 104 and the content delivery service 108. For example, the command 706 may be a call notification. In response, the content delivery service 108 provides a response 708 accepting the command to initiate the communication session 716. For example, the response 708 may be a call acceptance.

The call control agent 3 402 then notifies 710 the client device 104 that the content delivery service 108 accepted the command to initiate the communication session 716 and may receive an acknowledgement from the client device 104 in return. The call control agent 3 402 provides an acknowledgement 714 to the content delivery service 108.

In addition to establishing the communication session 716 between the client device 104 and the content delivery service 108, the call control agent 3 402 also updates the records in the data store 114 to indicate that the subsequent hold has been ended. For example, the call control agent 3 402 sends an update 718 to the data store 114 to update the record associated with the subsequent hold to remove the indication the client device 104 should be placed on hold when the subsequent hold is ended, delete the record and/or reallocate the unique identifier allocated to the subsequent hold. The call control agent 3 402 also sends an update 720 to the data store 114 to update the record associated with the initial hold to remove the indication that the client device 102 that initiated the initial hold should be placed on hold when the initial hold is ended. The update 720 may also include data identifying the communication session 716 between the client device 104 and the content delivery service 108. For example, the update 720 may include data identifying the call control agent 3 402 that manages signal processing for the communication session 716 between the client device 104 and the content delivery service 108.

Figure 8:
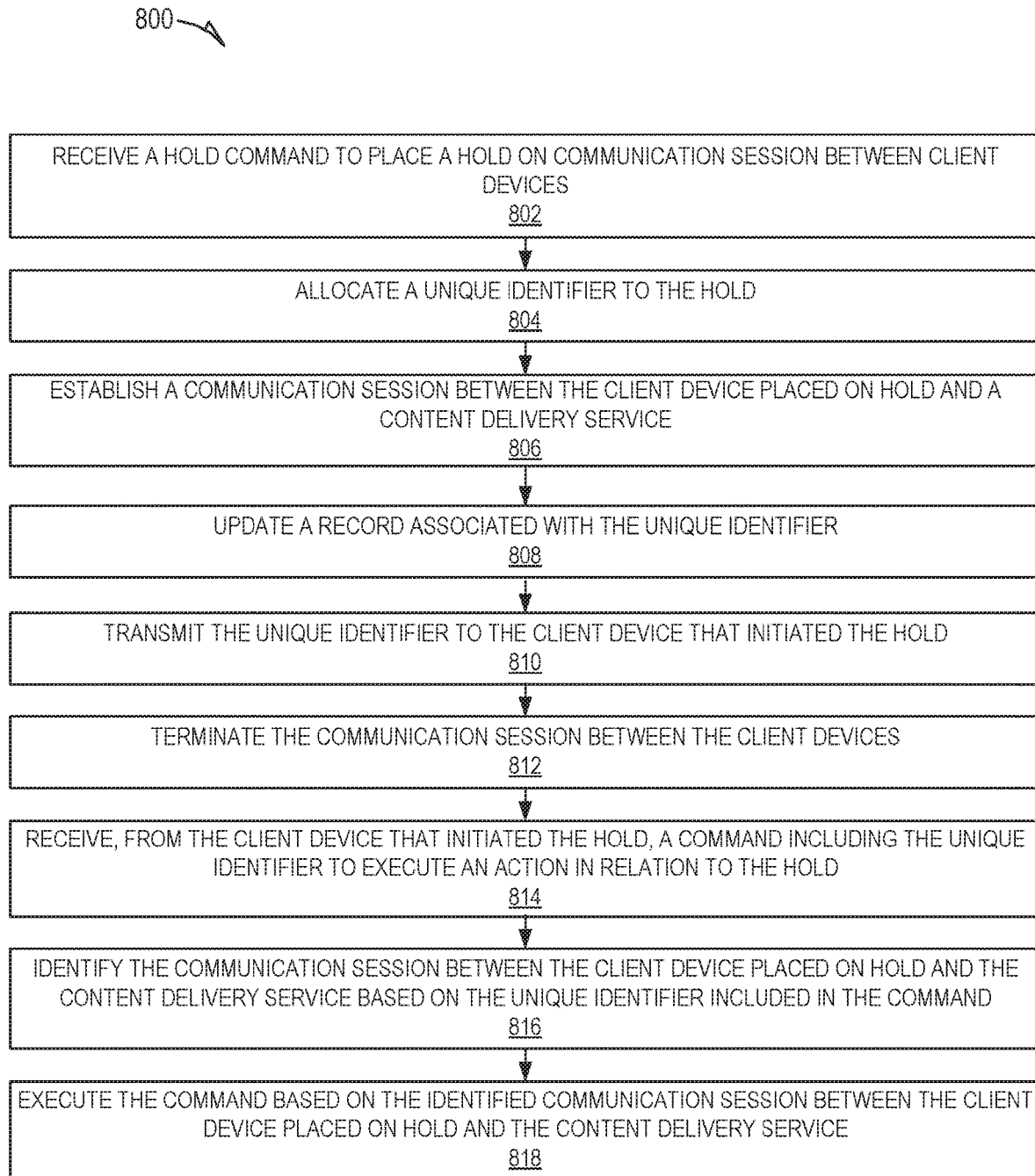
FIG. 8 is a flowchart showing an example method of delivering content during a hold, according to certain example embodiments.

FIG. 8 is a flowchart showing an example method 800 of delivering content during a hold, according to certain example embodiments. The method 800 may be embodied in computer readable instructions for execution by one or more processors such that the operations of the method 800 may be performed in part or in whole by the communication system 106; accordingly, the method 800 is described below by way of example with reference thereto. However, it shall be appreciated that at least some of the operations of the method 800 may be deployed on various other hardware configurations and the method 800 is not intended to be limited to the communication system 106.

At operation 802, the input module 202 receives a hold command to place a hold on a communication session between client devices 102, 104. The hold command is received from one of the client devices 102 that is engaged in the communication session and requests to place a hold on another client device 104 engaged in the communication session.

At operation 804, the unique identifier allocation module 208 allocates a unique identifier to the hold. In some embodiments, the unique identifier allocation module 208 generates a new unique identifier for the hold. For example, the unique identifier allocation module 208 may use a value generation algorithm that generates unique identifiers. The unique identifier allocation module 208 may also create a new record associated with the generated unique identifier in the data store 114 as part of allocating the unique identifier to the hold. The record may be used to store data associated with the hold.

Rather than generate a new unique identifier, in some embodiments, the unique identifier allocation module 208 communicates with the data store 114 to allocate a unique identifier to the hold. For example, the data store 114 may maintain a list of unique identifiers, including available unique identifier that are not currently allocated to a hold, and allocated unique identifiers that are currently allocated to a hold. The unique identifier allocation module 208 communicate with the data store 114 to identify an available unique identifier to allocate to the hold. The unique identifier allocation module 208 updates the data store 114 to indicate that the identified unique identifier has been allocated to the hold and is therefore not available to be allocated to another hold.

At operation 806, the communication session management module 204 establishes a communication session between the client device 104 that placed the hold and a content delivery service 108. The content delivery service 108 provides content, such as music or video, to the client device 104 during the hold. For example, the content delivery service 108 provides the client device 104 with content via the communication session established between the client device 104 and the content delivery service 108.

At operation 808, the record management module 210 updates a record associated with the unique identifier. The record management module 210 updates the record to include data identifying the communication session established between the client device 104 that placed the hold and a content delivery service 108. For example, the data may include an identifier for the call control agent 112 that manages signal processing for the communication session and/or a session identifier associated with the communication session.

At operation 810, the output module 214 transmits the unique identifier to the client device 102 that initiated the hold. The unique identifier can then be used to by the client device 102 to reference the hold when requesting to perform a related action.

At operation 812, the communication session management module 204 terminates the communication session between the client devices 102, 104.

At operation 814, the input module 202 receives, from the client device 102 that initiated the hold, a command including the unique identifier to execute an action in relation to the hold. For example, the command may request to execute an action such as ending the hold, terminating the communication session or providing a status of the hold.

At operation 816, the record management module 210 identifies the communication session between the client device 104 placed on hold and the content delivery service 108. For example, the record management module 210 uses the unique identifier included in the command to access the record corresponding to the unique identifier from the data store 114. The record management module 210 then identifier the communication session based on the data stored in the record, such as data identifying the call control agent 112 managing signal processing for the communication session and/or a session identifier associated with the communication session.

At operation 818, the action execution module 212 executes the command based on the identified communication session between the client device 104 placed on hold and the content delivery service 108. For example, the action execution module 212 executes a command such as ending the hold by initiating a replacement of the communication session between the client device 104 placed on hold and the content delivery service 108 with a new communication session 4 between the client devices 102, 104.

As another example, the action execution module 212 may execute a command to terminate the communication session by transmitting a command to the call control agent 112 managing signal processing for the communication session between the client device 104 placed on hold and the content delivery service 108. For example, the command may instruct the call control agent 112 to terminate the co communication session between the client device 104 placed on hold and the content delivery service 108.

As another example, the action execution module 212 may execute a command to provide the status of the hold by transmitting a command to the call control agent 112 managing signal processing for the communication session between the client device 104 placed on hold and the content delivery service 108 requesting the status of the communication session. The status of the communication session may indicate whether the communication session is active, terminated, or placed on hold. The action execution module 212 may then cause the output module 214 to return the status of the communication session to the client device 102.

Figure 9:
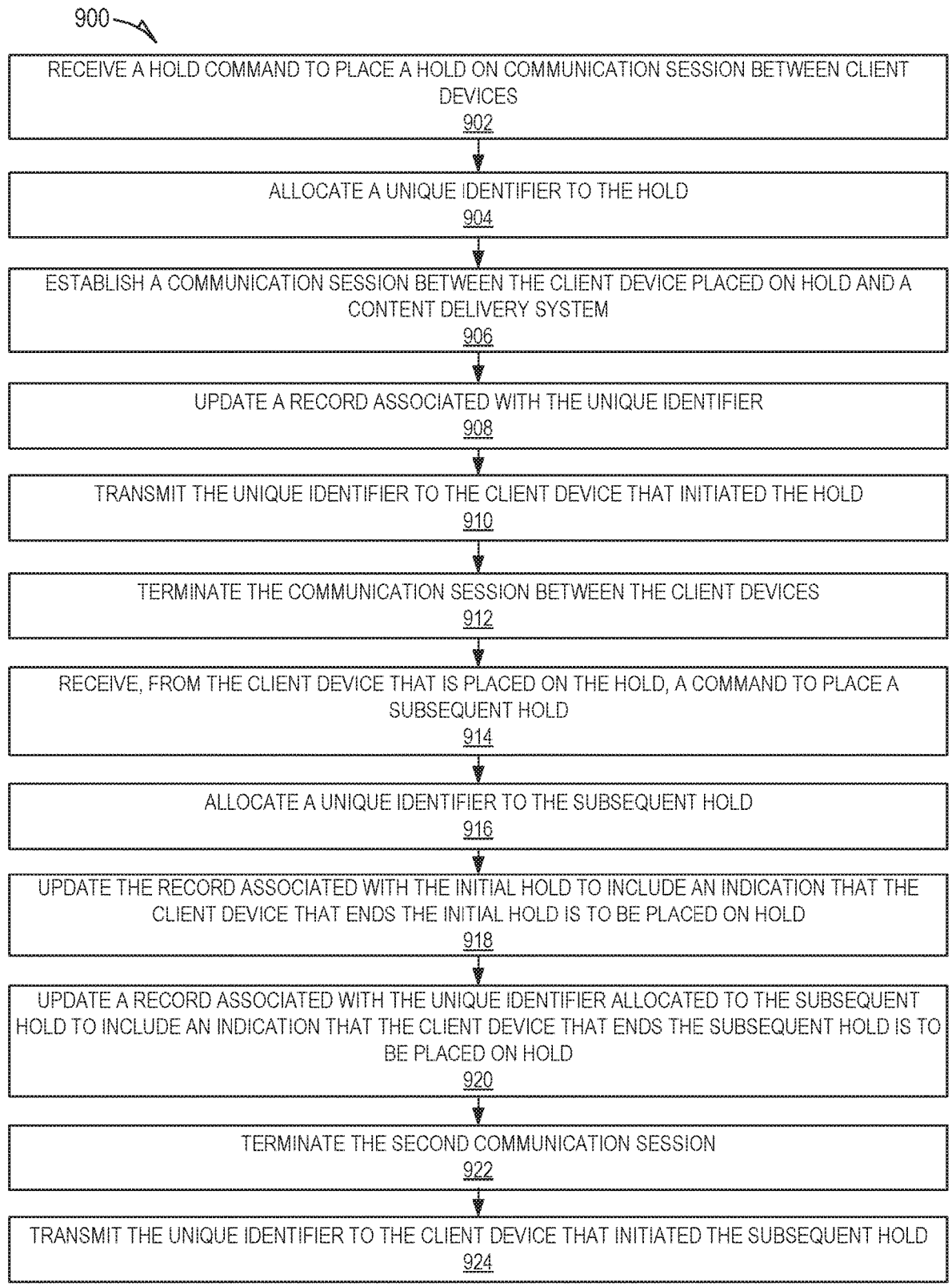
FIG. 9 is a flowchart showing an example method of initiating a subsequent hold, according to certain example embodiments.

FIG. 9 is a flowchart showing an example method 900 of initiating a subsequent hold, according to certain example embodiments. The method 900 may be embodied in computer readable instructions for execution by one or more processors such that the operations of the method 900 may be performed in part or in whole by the communication system 106; accordingly, the method 900 is described below by way of example with reference thereto. However, it shall be appreciated that at least some of the operations of the method 900 may be deployed on various other hardware configurations and the method 900 is not intended to be limited to the communication system 106.

At operation 902, the input module 202 receives a hold command to place a hold on a communication session between client devices 102, 104. The hold command is received by one client device 102 that is engaged in the communication session and requests to place a hold on another client device 104 engaged in the communication session.

At operation 904, the unique identifier allocation module 208 allocates a unique identifier to the hold. In some embodiments, the unique identifier allocation module 208 generates a new unique identifier for the hold. For example, the unique identifier allocation module 208 may use a value generation algorithm that generates unique identifiers. The unique identifier allocation module 208 may also create a new record associated with the generated unique identifier in the data store 114 as part of allocating the unique identifier to the hold. The record may be used to store data associated with the hold.

Rather than generate a new unique identifier, in some embodiments, the unique identifier allocation module 208 communicates with the data store 114 to allocate a unique identifier to the hold. For example, the data store 114 may maintain a list of unique identifiers, including available unique identifier that are not currently allocated to a hold, and allocated unique identifiers that are currently allocated to a hold. The unique identifier allocation module 208 communicate with the data store 114 to identify an available unique identifier to allocate to the hold. The unique identifier allocation module 208 updates the data store 114 to indicate that the identified unique identifier has been allocated to the hold and is therefore not available to be allocated to another hold.

At operation 906, the communication session management module 204 establishes a communication session between the client device 104 that placed the hold and a content delivery service 108. The content delivery service 108 provides content, such as music or video, to the client device 104 during the hold. For example, the content delivery service 108 provides the client device 104 with content via the communication session established between the client device 104 and the content delivery service 108.

At operation 908, the record management module 210 updates a record associated with the unique identifier. The record management module 210 updates the record to include data identifying the communication session established between the client device 104 that placed the hold and a content delivery service 108. For example, the data may include an identifier for the call control agent 112 that manages signal processing for the communication session and/or a session identifier associated with the communication session.

At operation 910, the output module 214 transmits the unique identifier to the client device 102 that initiated the hold. The unique identifier can then be used to by the client device 102 to reference the hold when requesting to perform a related action.

At operation 912, the communication session management module 204 terminates the communication session between the client devices 102, 104.

At operation 914, the input module 202 receives, from the client device 104 that is placed on hold, a command to place a subsequent hold. The subsequent hold is a hold placed on the content delivery service 106. Accordingly, creating a communication session with the content delivery service 106 to provide content during the subsequent hold provides no user value. Accordingly, the subsequent hold is represented virtually.

To accomplish this, at operation 916, the unique identifier allocation module 208 allocates a unique identifier to the subsequent hold. As the subsequent hold results in concurrently placed holds, whichever client device 102, 104 ends their respective hold first should be placed on hold until the other hold is also ended. Accordingly, at operation 918 the record management module 210 updates the record associated with the initial hold to include an indication that the client device 102 that ends the initial hold is to be placed on hold. In the event that the client device 102 that initiated the initial hold transmits a command to end the initial hold prior the subsequent hold being ended, the unique identifier included in the command will be used to identify the corresponding record and indication. As a result, the client device 102 will be placed on hold and a communication session will be established between the client device 102 and the content delivery service 108.

Likewise, at operation 920 the record management module 210 updates a record associated with the unique identifier allocated to the subsequent hold to include an indication that the client device 104 that ends the subsequent hold is to be placed on hold. In the event that the client device 104 that initiated the subsequent hold transmits a command to end the subsequent hold prior the initial hold being ended, the unique identifier included in the command will be used to identify the corresponding record and indication. As a result, the client device 104 will be placed on hold and a communication session will be established between the client device 104 and the content delivery service 108.

At operation 922, the communication session management module 204 terminates the communication session between the client device 104 placed on hold and the content delivery service 108.

At operation 924, the output module 214 transmits the unique identifier allocated to the subsequent hold to the client device 102 that initiated the subsequent hold. The unique identifier can then be used to by the client device 104 to reference the subsequent hold when requesting to perform a related action (e.g., end the subsequent hold, request a status of the subsequent hold, etc.).

Software Architecture

Figure 10:
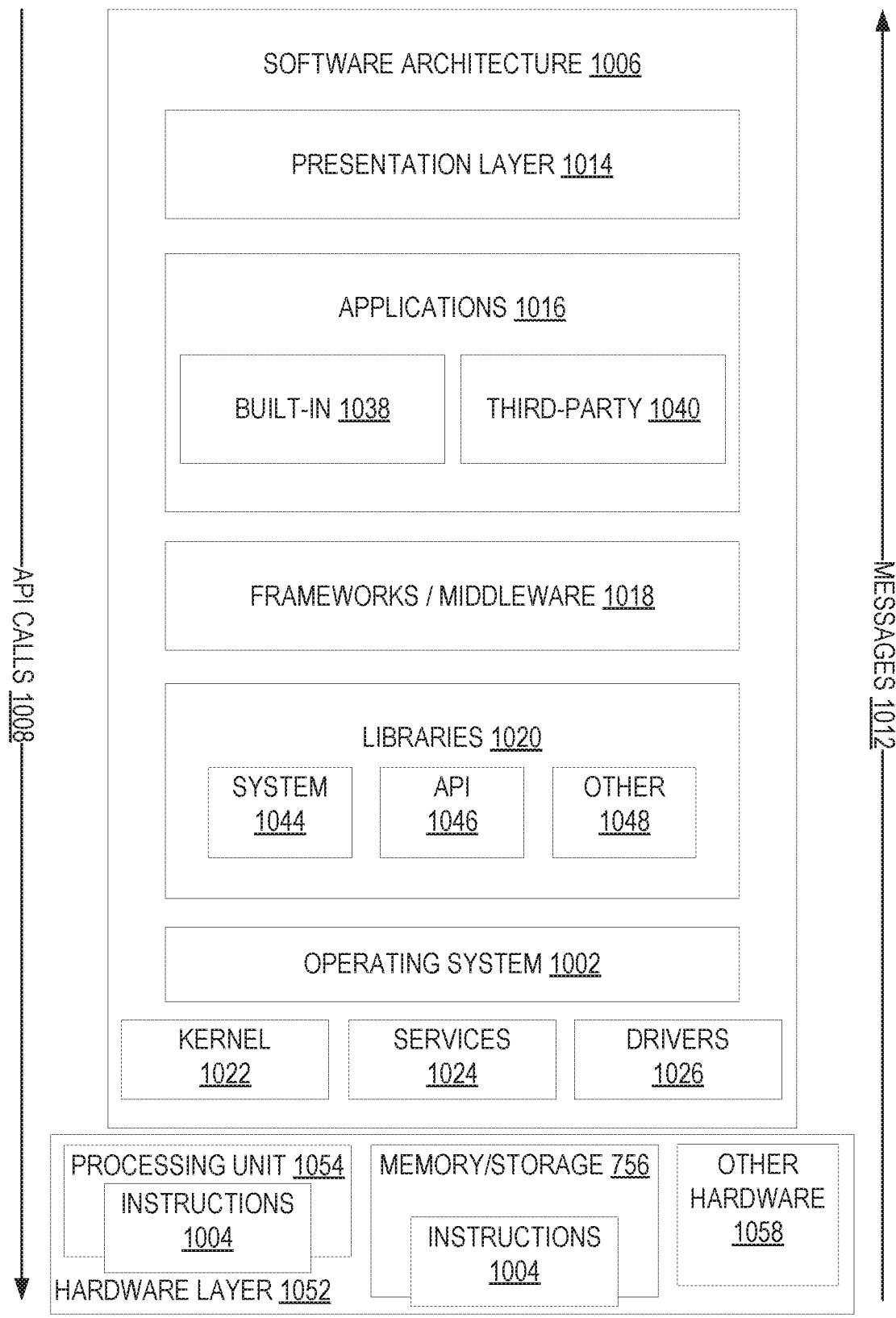
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture 1006 and it will be appreciated that many other architectures may be implemented to facilitate the functionality described herein. The software architecture 1006 may execute on hardware such as machine 1100 of FIG. 11 that includes, among other things, processors 1104, memory 1114, and (input/output) I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components, and so forth described herein. The hardware layer 1052 also includes memory and/or storage modules 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke application programming interface (API) calls 1008 through the software stack and receive a response such as messages 1012 in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphical user interface (GUI) functions, high-level resource management, high-level location services, and so forth. The frameworks/middleware 1018 may provide a broad spectrum of other APIs that may be used by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024, and/or drivers 1026), libraries 1020, and frameworks/middleware 1018 to create UIs to interact with users of the system. Alternatively, or additionally, in some systems, interactions with a user may occur through a presentation layer, such as presentation layer 1014. In these systems, the application/component "logic" can be separated from the aspects of the application/component that interact with a user.

Figure 11:
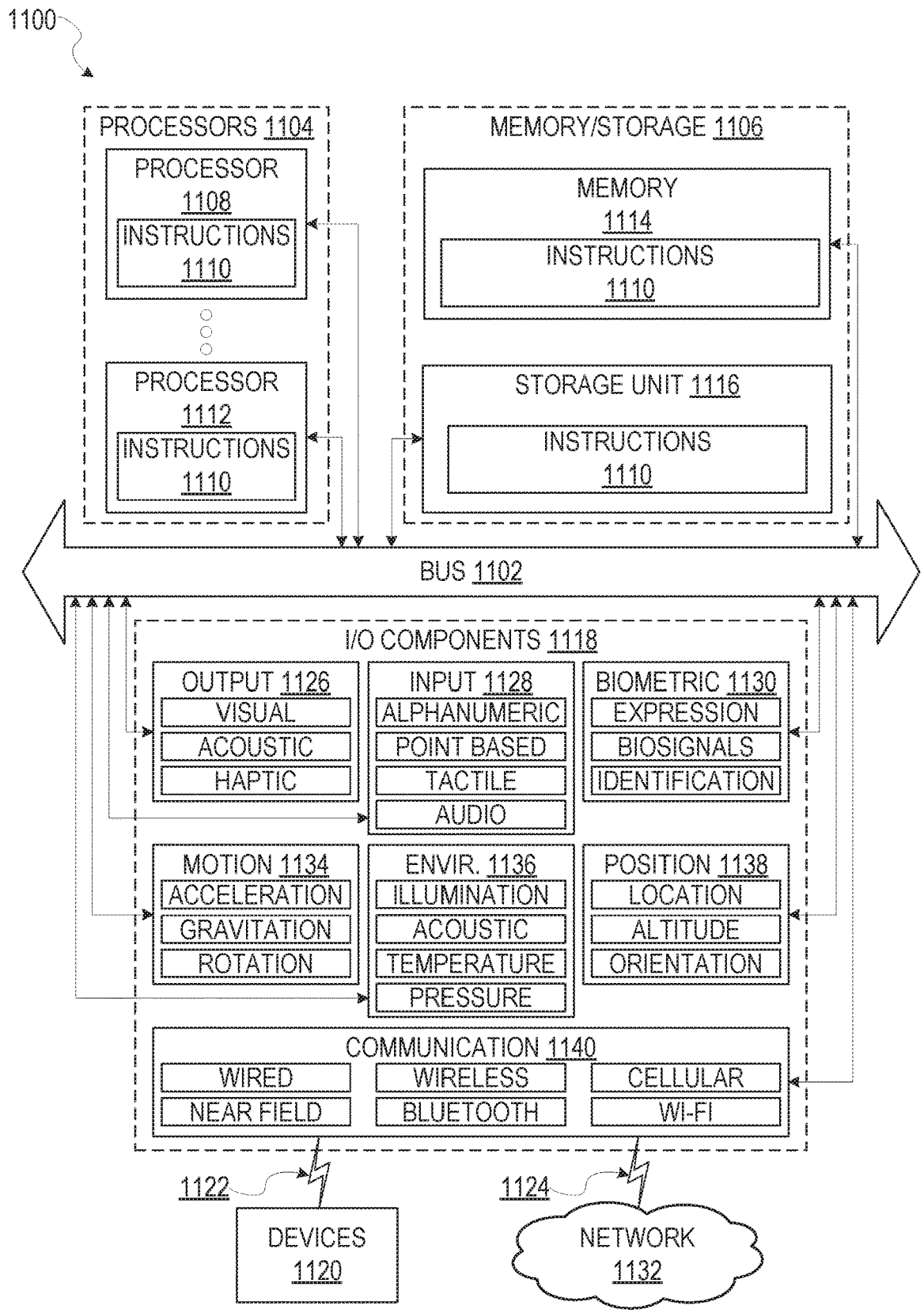
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions 1004 from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an apples, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1100 capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environmental components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1124 and coupling 1122, respectively. For example, the communication components 1140 may include a network interface component or other suitable device to interface with the network 1132. In further examples, communication components 1140 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1110 for execution by the machine 1100, and includes digital or analog communications signals or other intangible medium to facilitate communication of such instructions 1110. Instructions 1110 may be transmitted or received over the network 1132 using a transmission medium via a network interface device and using any one of a number of well-known transfer protocols.

"CLIENT DEVICE" in this context refers to any machine 1100 that interfaces to a communications network 1132 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1132.

"COMMUNICATIONS NETWORK" in this context refers to one or more portions of a network 1132 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1132 or a portion of a network 1132 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1110 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1110. The term "machine-readable medium" shall also be taken to include any medium, or combination of multiple media, that is capable of storing instructions 1110 (e.g., code) for execution by a machine 1100, such that the instructions 1110, when executed by one or more processors 1104 of the machine 1100, cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1104) may be configured by software (e.g., an application 1016 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1104 or other programmable processor 1104, Once configured by such software, hardware components become specific machines 1100 (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1104 configured by software to become a special-purpose processor, the general-purpose processor 1104 may be configured as respectively different special-purpose processors (e.g., comprising different hardware components) at different times. Software accordingly configures a particular processor or processors 1104, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1102) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1104 that are temporarily configured (e.g., by software) or permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1104. Similarly, the methods described herein may be at least partially processor-implemented, with a particular processor or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a network 1132 (e.g., the Internet) and via one or more appropriate interfaces (e.g., an API). The performance of certain of the operations may be distributed among the processors 1104, not only residing within a single machine 1100, but deployed across a number of machines 1100. In some example embodiments, the processors 1104 or processor-implemented components may be located in a single geographic location (e.g., within a home environment, an office environment, or a server farm). In other example embodiments, the processors 1104 or processor-implemented components may be distributed across a number of geographic locations.

"PROCESSOR" in this context refers to any circuit or virtual circuit (a physical circuit emulated by logic executing on an actual processor 1104) that manipulates data values according to control signals "commands," "op codes," "machine code," etc. and which produces corresponding output signals that are applied to operate a machine 1100. A processor 1104 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1104 may further be a multi-core processor having two or more independent processors 1104 (sometimes referred to as "cores") that may execute instructions 1110 contemporaneously.

What is claimed is:

1. A method for placing concurrent holds, the method comprising:

receiving, from a first device, a first hold command to initiate a first hold in relation to a first communication session between the first device and a second device;

allocating a first unique identifier to the first hold;

initiating a second communication session between the second device and a content delivery service, the content delivery service providing content to the second device via the second communication session during the first hold;

updating a first record associated with the first unique identifier to include data identifying the second communication session;

providing the first unique identifier to the first device, the first unique identifier enabling the first device to reference the first hold;

terminating the first communication session;

receiving, from the second device, a second hold command to initiate a second hold in relation to the second communication session between the second device and the content delivery service;

allocating a second unique identifier to the second hold;

updating the first record associated with the first unique identifier to include an indication that the first device is to be placed on hold when the first hold is ended;

updating a second record associated with the second unique identifier to include an indication that the second device is to be placed on hold when the second hold is ended;

returning the second unique identifier to the second device, the second unique identifier enabling the second device to reference the second hold; and terminating the second communication session.

2. The method of claim 1, further comprising:

receiving, from the first device, a command to end the first hold, the command to end the first hold including the first unique identifier;

identifying the first record based on the first unique identifier included in the command to end the first hold;

determining, based on the indication included in the first record, that the first device is to be placed on hold when the first hold is ended;

establishing a third communication session between the first device and the content delivery service;

updating the first record to remove the indication that the first device is to be placed on hold when the first hold is ended; and updating the second record to include data identifying the third communication session.

3. The method of claim 2, further comprising:

receiving, from the second device, a command to end the second hold, the command to end the second hold including the second unique identifier;

identifying the third communication session based on the second record associated with the second unique identifier included in the command to end the second hold;

establishing a fourth communication session between the first device and the second device; and terminating the third communication session.

4. The method of claim 3, wherein establishing the third communication session comprises:

transmitting a call replacement command to the second device; and in response to receiving a call replacement acceptance from the second device, initiating the fourth communication session between the first device and the second device.

5. The method of claim 1, further comprising:

receiving, from the second device, a command to end second hold, the command to end the second hold including the second unique identifier;

identifying the second record based on the second unique identifier included in the command to end the second hold;

determining, based on the indication included in the second record, that the second device is to be placed on hold when the second hold is ended;

establishing a third communication session between the first device and the content delivery service;

updating the second record to remove the indication that the second device is to be placed on hold when the second hold is ended; and updating the first record to include data identifying the third communication session.

6. The method of claim 5, further comprising:

receiving, from the first device, a command to end the first hold, the command to end the first hold including the first unique identifier;

identifying the third communication session based on the first record associated with the first unique identifier included in the command to end the first hold;

establishing a fourth communication session between the first device and the second device; and terminating the third communication session.

7. The method of claim 1, wherein the content delivery service provides a music stream.

8. The method of claim 1, wherein the content delivery service provides a video stream.

9. The method of claim 1, further comprising:

receiving, from the first device, a command to provide a status of the first hold, the command to provide the status of the first hold including the first unique identifier;

determining, based on the first record associated with the first unique identifier included in the command to provide the status of the first hold, that the second device placed the second hold; and returning a status update to the first device indicating that the second device placed the second hold.

10. A system for placing concurrent holds, the system comprising:

one or more computer processors; and one or more computer-readable mediums storing instructions that, when executed by the one or more computer processors, cause the system to perform operations comprising:

receiving, from a first device, a first hold command to initiate a first hold in relation to a first communication session between the first device and a second device;

allocating a first unique identifier to the first hold;

allocating a first unique identifier to the first hold;

initiating a second communication session between the second device and a content delivery service, the content delivery service providing content to the second device via the second communication session during the first hold;

updating a first record associated with the first unique identifier to include data identifying the second communication session;
providing the first unique identifier to the first device, the first unique identifier enabling the first device to reference the first hold;
terminating the first communication session;
receiving, from the second device, a second hold command to initiate a second hold in relation to the second communication session between the second device and the content delivery service;
allocating a second unique identifier to the second hold;
updating the first record associated with the first unique identifier to include an indication that the first device is to be placed on hold when the first hold is ended;
updating a second record associated with the second unique identifier to include an indication that the second device is to be placed on hold when the second hold is ended;
returning the second unique identifier to the second device, the second unique identifier enabling the second device to reference the second hold; and
terminating the second communication session.

11. The system of claim 10, the operations further comprising:
receiving, from the first device, a command to end the first hold, the command to end the first hold including the first unique identifier;
identifying the first record based on the first unique identifier included in the command to end the first hold;
determining, based on the indication included in the first record, that the first device is to be placed on hold when the first hold is ended;
establishing a third communication session between the first device and the content delivery service;
updating the first record to remove the indication that the first device is to be placed on hold when the first hold is ended; and
updating the second record to include data identifying the third communication session.

12. The system of claim 11, the operations further comprising:
receiving, from the second device, a command to end the second hold, the command to end the second hold including the second unique identifier;
identifying the third communication session based on the second record associated with the second unique identifier included in the command to end the second hold;
establishing a fourth communication session between the first device and the second device; and
terminating the third communication session.

13. The system of claim 12, wherein establishing the third communication session comprises:
transmitting a call replacement command to the second device; and
in response to receiving a call replacement acceptance from the second device, initiating the fourth communication session between the first device and the second device.

14. The system of claim 10, the operations further comprising:
receiving, from the second device, a command to end second hold, the second command to end the second hold including the second unique identifier;
identifying the second record based on the second unique identifier included in the command to end the second hold;
determining, based on the indication included in the second record, that the second device is to be placed on hold when the second hold is ended;
establishing a third communication session between the first device and the content delivery service;
updating the second record to remove the indication that the second device is to be placed on hold when the second hold is ended; and
updating the first record to include data identifying the third communication session.

15. The system of claim 14, the operations further comprising:
receiving, from the first device, a command to end the first hold, the command to end the first hold including the first unique identifier;
identifying the third communication session based on the first record associated with the first unique identifier included in the command to end the first hold;
establishing a fourth communication session between the first device and the second device; and
terminating the third communication session.

16. The system of claim 10, wherein the content delivery service provides a music stream.

17. The system of claim 10, wherein the content delivery service provides a video stream.

18. The system of claim 10, the operations further comprising:
receiving, from the first device, a command to provide a status of the first hold, the command to provide the status of the first hold including the first unique identifier;
determining, based on the first record associated with the first unique identifier included in the command to provide the status of the first hold, that the second device placed the second hold; and
returning a status update to the first device indicating that the second device placed the second hold.

19. A machine-readable medium storing instructions that, when executed by one or more computer processors of one or more computing devices, cause the one or more computing devices to perform operations for placing concurrent holds, the operations comprising:
receiving, from a first device, a first hold command to initiate a first hold in relation to a first communication session between the first device and a second device;
allocating a first unique identifier to the first hold;
allocating a first unique identifier to the first hold;
initiating a second communication session between the second device and a content delivery service, the content delivery service providing content to the second device via the second communication session during the first hold;
updating a first record associated with the first unique identifier to include data identifying the second communication session;
providing the first unique identifier to the first device, the first unique identifier enabling the first device to reference the first hold;
terminating the first communication session;
receiving, from the second device, a second hold command to initiate a second hold in relation to the second communication session between the second device and the content delivery service;
allocating a second unique identifier to the second hold;
updating the first record associated with the first unique identifier to include an indication that the first device is to be placed on hold when the first hold is ended;

updating a second record associated with the second unique identifier to include an indication that the second device is to be placed on hold when the second hold is ended;

returning the second unique identifier to the second device, the second unique identifier enabling the second device to reference the second hold; and terminating the second communication session.

20. The machine-readable medium of claim 19, the operations further comprising:

receiving, from the first device, a command to end the first hold, the command to end the first hold including the first unique identifier;

identifying the first record based on the first unique identifier included in the command to end the first hold;

determining, based on the indication included in the first record, that the first device is to be placed on hold when the first hold is ended;

establishing a third communication session between the first device and the content delivery service;

updating the first record to remove the indication that the first device is to be placed on hold when the first hold is ended; and updating the second record to include data identifying the third communication session.

* * * * *